(12) United States Patent
Hong

(10) Patent No.: US 7,216,975 B2
(45) Date of Patent: May 15, 2007

(54) METHOD FOR PREPARING THE REACTIVE TINTING COMPOUND AND THE TINTED CONTACT LENS

(76) Inventor: Shinn-Gwo Hong, 9F, No. 11, Lane 81, Yuan-Tung Rd., Chungli City (TW)

( * ) Notice: Subject to any disclaimer, the term of this patent is extended or adjusted under 35 U.S.C. 154(b) by 77 days.

(21) Appl. No.: 11/134,206

(22) Filed: May 20, 2005

(65) Prior Publication Data

US 2005/0251929 A1    Nov. 17, 2005

Related U.S. Application Data

(63) Continuation-in-part of application No. 10/620,783, filed on Jul. 15, 2003, now abandoned.

(51) Int. Cl.
*G02C 7/04* (2006.01)

(52) U.S. Cl. ............................. 351/162; 8/507; 351/177
(58) Field of Classification Search ................. 351/162
See application file for complete search history.

(56) References Cited

U.S. PATENT DOCUMENTS

| | | | |
|---|---|---|---|
| 4,157,892 A | 6/1979 | Tanaka et al. | 351/162 |
| 4,252,421 A | 2/1981 | Foley | 351/162 |
| 4,468,229 A | 8/1984 | Su | 8/507 |
| 4,553,975 A | 11/1985 | Su | 351/162 |
| 4,559,059 A | 12/1985 | Su | 427/164 |
| 4,640,805 A | 2/1987 | Neefe | 264/1.1 |
| 4,670,506 A * | 6/1987 | Goldenberg et al. | 525/59 |
| 4,702,574 A * | 10/1987 | Bawa | 351/162 |
| 4,795,794 A | 1/1989 | Winnik et al. | 526/259 |
| 4,891,046 A | 1/1990 | Wittmann et al. | 8/507 |
| 4,929,250 A | 5/1990 | Hung et al. | 544/180 |
| 5,194,556 A * | 3/1993 | Mueller et al. | 528/28 |
| 5,292,350 A | 3/1994 | Molock et al. | 351/160 |
| 5,352,245 A | 10/1994 | Su | 351/162 |
| 5,480,927 A | 1/1996 | Janssen et al. | 524/100 |
| 5,516,467 A | 5/1996 | Niwa et al. | 264/1.1 |
| 5,871,675 A | 2/1999 | Muller et al. | 264/1.38 |
| 5,938,795 A | 8/1999 | Molock et al. | 8/507 |
| 5,944,853 A | 8/1999 | Molock et al. | 8/506 |
| 5,981,615 A * | 11/1999 | Meijs et al. | 522/137 |
| 6,149,692 A * | 11/2000 | Lally et al. | 8/444 |
| 6,149,842 A | 11/2000 | Lally et al. | 264/1.36 |
| 6,162,844 A | 12/2000 | Lally et al. | 523/106 |
| 6,638,991 B2 * | 10/2003 | Baba et al. | 522/99 |
| 6,774,178 B2 * | 8/2004 | Turek et al. | 524/858 |

* cited by examiner

*Primary Examiner*—Ricky Mack
*Assistant Examiner*—Jessica Stultz

(57) ABSTRACT

A method for preparing the tinted contact lens with the covalently bonded novel reactive tinting compound is disclosed. The reactive tinting compound with mono vinyl functionality is prepared by reacting the reactive dye with a hydrophilic monomer containing both pendent hydroxyl and vinyl groups under an alkaline condition. The water soluble reactive dyes containing either difluoro-chloropyrimidine or β-sulphatoethylsulphone reactive groups are used for synthesis of the reactive tinting dye. The lens forming materials are photo-polymerized in the presence of the reactive tinting compound to prepare a tinted contact lens. The reactive tinting compound is copolymerized with the lens forming monomers in a single photo-polymerization step that requires no subsequently alkaline soaking or developing step as used in the prior art. In addition, the covalently bonded dye is stable and durable in the lens and does not fade or leach out after multiple high-pressure thermal sterilizations.

32 Claims, No Drawings

METHOD FOR PREPARING THE REACTIVE TINTING COMPOUND AND THE TINTED CONTACT LENS

CROSS REFERENCE TO RELATED APPLICATIONS

This invention is a continuation in part of U.S. Ser. No. 10/620,783, filed on Jul. 15, 2003 now abandoned.

BACKGROUND OF THE INVENTION

1. Field of the Invention

The present invention relates to a process for preparing a reactive tinting compound and the use of such a compound to manufacture the tinted soft contact lenses. More particularly, the invention relates to a tinted hydrophilic soft contact lens containing covalently bonded dye that does not leach out and fade after multiple autoclave sterilization.

2. The Prior Arts

Many different processes have been disclosed to produce tinted or color ophthalmic lenses, such as contact lenses, for various functional purposes. For example, the tinted lens not only can serve the purpose of changing the apparent color or the iris of the wearer but also offer the lenses to be easily located in the clear solution within the lens storage, disinfecting, or cleaning container.

Usually, the tinting dye can be imparted to the lens either before or after the lens forming materials are polymerized. A conventional method to impart color to the contact lens is to dissolve or disperse the inorganic pigment or the long chain organic dye in the monomer precursor or in the polymer matrix before the lens is formed. The inorganic pigment or the long chain organic dye is entrapped in the lens to give the desirable color. However, this method is inadequate for coloring the hydrophilic soft contact lens because the great water content in the lens usually induces a migration or leaching of the colorant. This undesirable migration or leaching can be accelerated during the high-pressure heat sterilization treatment as commonly applied with the hydrophilic soft lens.

The use of a water insoluble dye in the soft lens to alleviate the aforementioned shortage is proposed in U.S. Pat. No. 4,252,421. The tinted lens is prepared by heat curing hydrophilic lens forming monomers with the presence of the water insoluble phthalocyanine dye such as the copper phthalocyanine. The phthalocyanine dye is entrapped in the finished lens and believed to be stable at a maximal hydration content of 35.7%. Unfortunately, this water insoluble phthalocyanine dye still can leach out of the lens with the use of the hydroxyethyl methacrylate (HEMA) as the hydrophilic comonomer and with a water content of 40%. Moreover, the leaching problem may worsen with greater water content.

The use of copper phthalocyanine pigment (Color Index Pigment Blue 15) to prepare a tinted contact lens is also disclosed in U.S. Pat. No. 6,149,842. The copper phthalocyanine pigment is firstly dispersed in an aqueous solution containing the polyvinyl alcohol (PVA) as a dispersing agent, and then mixed with the crosslinkable PVA precursor and subsequently photopolymerized in the mold to form the lens. No detail in performance of this dye in the as-formed lens is disclosed. As described previously, the leaching occurred at large water content is a potential problem.

A similar concept is disclosed in U.S. Pat. No. 5,516,467 in which a vat dye (for example, C. I. Vat Blue 6) is converted to a leuco compound and dissolved in the hydrophilic N,N-dimethyl acrylamide monomer to prepare a tinted monomer solution. Then this solution is polymerized with other constituents under heat to form the lens and subsequently boiled to convert the solubilized leuco compound into an insoluble vat dye. Although the vat dye is not covalently bonded with the lens forming materials, it is reported to have a great stability and does not fade after 200 hours in the boiling water. However, the fixed vat dye may again be converted to the soluble leuco compound under a suitable alkaline condition and be unevenly reacted under an acid environment.

The other method for imparting color to a contact lens is to coat the finished lens by printing or transfer printing method. Basically, this method usually applies coloring ink containing solvent-based colorant to the lens with a silicone rubber pad. The transferring method is questionable because it could not give an unblemished, solid covering of colorant on the dry lens surface. Many attempts have been suggested to solve this problem. Some propose to use multiple transfer printing steps to coat mottled color dots onto the lens surface. Some apply pigment/monomer suspension to the mold that is stamped or printed with specific geometries and spacing, and then form the tined lens with the conventional spin casting technique as disclosed in U.S. Pat. No. 4,640,805. Despite the ease of the blemish defect, all these modified methods suffer the potential risk of colorant migration during autoclave sterilization because of using the non-covalently bonded dyes. As a result, the reactive tinting dye that can be copolymerized with lens materials is preferred to prevent leaching of the dye from the lenses during various service environments.

A reactive dye used for preparing the transfer printing ink to remedy the previous migration shortage is disclosed in U.S. Pat. No. 5,352,245. The patent proposes using a reactive dye, e.g., Ramazol Black B, together with the polyvinylpyrolidone binder and a non-ionic surfactant to prepare the ink and then transfer printing it onto the hydrophilic contact lens to form the tinted lens with the desired pattern. The reactive dye is supposed to be covalently bonded with the lens materials after subsequent immersion in the basic solution. Yet no performance detail of the tined lens is disclosed. In addition, the method is tedious and has the shortage similar to that present in the soaking-to-fix techniques.

Many patents including U.S. Pat. Nos. 4,559,059, 4,468,229, 4,157,892, 4,891,046, 4,553,975, 4,929,250, 5,292,350, and 5,480,927 propose the lens tinting method by soaking the formed lens together with the reactive dye in the alkaline solution to chemically bond the dyes with the lens materials. The reactive tinting dye can either be premixed with the monomer mixtures before the polymerization step or be added to the basic solution after the lens is polymerized. Regardless of different reactive dyes and procedures proposed in these patents, they are usually time-consuming and require multiple steps, such as neutralization, extraction, and rinsing steps to tint the lens. Additionally, the processing variables should be carefully controlled to prevent uneven dispersion and colorization.

A more promising method to add the desirable color to the lens is to covalently bond the monomer or prepolymer with the reactive dye first and then introduce this functionalized precursor to the mold and cure. This technique will greatly alleviate the processing problems described in soaking-to-fix methods. A few of patents, for example, U.S. Pat. Nos. 4,252,421, 5,944,853, 5,938,795, 5,871,675, 6,149,692, 4,795,794, and 6,162,844, use the aforementioned technique to chemically fix the dye with the lens forming materials before the polymerization step. The differences among these patents are mainly on types of reactive dye and precursor reacted. Although advantages are obtained in these patents, some patents still have problems such as the low yield and tedious purification step. For example, a vinyl-sulfone type reactive dye (C. I. Reactive Black 5) that reacted with the hydroxyethyl methacrylate to prepare the dye-monomer compound with no activating step used is disclosed in U.S. Pat. No. 5,944,853 but a very low yield is obtained. This dye-monomer compound is not used to prepare the soft contact lens as described in U.S. Pat. No. 5,938,795 from the same inventors of U.S. Pat. No. 5,944,853.

U.S. Pat. No. 6,149,692 issued to Lally et al. discloses a method of contacting a functionalized dye with a high molecular weight crosslinkable polymer precursor, dispensing the solution into a mold and applying radiation, thereby forming a molded article having dye covalently boned to the polymer backbone. The dye essentially copolymerizes with the polymeric precursor. The polymer precursor (such as PVA) used in Lally et al. has an average molecular weight of at least about 2000. The PVA oligomer used by Lally et al. does not have reactive vinyl groups in the beginning. Therefore, a so-called polymer precursor functionalizer is prepared first and then the functionalizer is reacted with the PVA oligomer to introduce the crosslinkable vinyl group to the PVA molecules. The crosslinkable polymer precursor is then purified and subsequently reacted with the activated dye. There are multiple procedures involved in preparing the crosslinkable PVA-DYE compounds.

In summary, the previous patents disclosed for the production of tinted contact lenses usually suffer one or more undesired nature such as long processing time, low degree of conversion, leaching of weakly bonded dye, fading, inconsistent shade of the tinted lens, and tedious reacting or purification process. Henceforth, there exists a need for preparing the tinted contact lens with a great color fastness but without aforementioned shortages.

SUMMARY OF THE INVENTION

A primary object of the present invention is to provide an easy process to prepare a mono-functional reactive tinting compound with high purity and reactivity.

The other object of the present invention is to provide an efficient and simplified process for preparing tinted soft contact lenses and in which a reactive tinting compound containing mono-unsaturated vinyl group is covalently bonded to the lens materials through a polymerization process. The as-formed tinted lenses thus require no further rinsing step to remove residual dye or impurities from the lenses after curing the invented reactive tinting compound and lens forming monomers in the mold to form the tinted lenses.

Another object of the present invention is to provide an improved method to incorporate reactive coloring agent into a lens that has a great color fastness and does not leach or degrade after multiple autoclave sterilizations. This outstanding durability results from the property that the invented reactive tinting compound is capable of covalently bonding with the lens forming materials during cure and has a great thermal stability in the polymeric backbones.

A further object of the present invention is to provide an efficient method to color contact lens without any subsequent dying or developing procedures. In the present invention, the dye is chemically fixed on the monomer to form a reactive tinting compound prior to polymerization with other hydrophilic monomers to form the lens. As a result, the lens does not need to be immersed in the alkaline solution or in the dye containing aqueous solution to develop a color after the lens is formed. Additionally, neither subsequent activation nor extraction step is required for the as-formed lens.

The method for preparing a reactive tinting compound comprises the steps of carrying out a reaction of a first compound (monomer) having a molecular weight under 300 g/mol with a second compound to generate a product of reactive tinting compound, wherein the first compound is a hydrophilic compound with pendant hydroxyl and unsaturated vinyl groups, and the second compound is a radiation-absorbing and water soluble dye with substituted fluoro-chloropyrimidine or β-sulphatoethylsulphone reactive group; and recovering the product of reactive tinting compound after the reaction is completed. The reactive tinting compound of the present invention can be represented by a formula of AB, wherein A is a hydrophilic compound having a molecular weight under 300 g/mol with pendant hydroxyl and unsaturated vinyl groups, and B is a radiation-absorbing and water soluble dye originally with difluoro-chloropyrimidine or β-sulphatoethylsulphone reactive group.

DETAILED DESCRIPTION OF THE PREFERRED EMBODIMENT

The present invention is mainly applicable to tint soft contact lenses, both corrective and noncorrective. The invention includes synthesis of the reactive tinting compound by a simple procedure. The invention also includes a process for preparing tinted soft contact lenses with a great color fastness by incorporating a reactive tinting compound in the lens forming materials prior to polymerization.

The reactive tinting compound contains a color absorbing moiety and one unsaturated reactive vinyl group. Through the reactive vinyl group, the reactive tinting compound can be covalently bonded with the lens forming materials.

The method for preparing a reactive tinting compound comprises the steps of carrying out a reaction of a first compound having a molecular weight under 300 g/mol with a second compound to generate a product of reactive tinting compound, wherein the first compound is a hydrophilic compound with pendant hydroxyl and unsaturated vinyl groups, and the second compound is a radiation-absorbing and water soluble dye with substituted fluoro-chloropyrimidine or β-sulphatoethylsulphone reactive group; and recovering the product of reactive tinting compound after the reaction is completed.

The first compound which is a hydrophilic vinylic monomer containing hydroxyl or amine group is reacted with the second dye compound to prepare the reactive tinting compound with one reactive vinyl group. The preferred first compound is a comonomer used to prepare hydrophilic soft contact lens and may be 2-hydroxyethyl methacrylate (HEMA), hydroxylethyl acrylate, methacrylamide, acrylic acid, vinyl pyridine, N-vinylpyrrolidone, glycerol methacrylate and the like. Comparing to the high molecular weight polymer precursor (at least about 2000 in average ) used in U.S. Pat. No. 6,149,692, the first compound of the present invention can be directly applied to the reaction with a second compound without any steps of preparation of functionalizer, crosslinkable vinyl functionalization or further purification. Thus, the process for preparing the reactive tinting compound can be greatly simplified.

The second compound may be commercially available or can be prepared by the conventional techniques known in the field of organic synthesis. The preferred second compound of commercial reactive dyes includes different types of substituted fluoro-chloropyrimidines containing water soluble sulfonate groups. These reactive dye reactants include, but not limited to, Color Index (C. I.) Reactive Orange 62, C. I. Reactive Orange 64, C. I. Reactive Red 118, C. I. Reactive Red 119, C. I. Reactive Red 123, C. I. Reactive Red 200, C. I. Reactive Red 201, C. I. Reactive Red F-3B, C. I. Reactive Scarlet F-2G, C. I. Reactive Blue 103 (RB103), C. I. Reactive Blue 104, and C. I. Reactive Blue 114 (RB 114).

The preferred second compound of commercial reactive dyes also includes different types of β-sulphatoethylsulphone derivatives containing water soluble sulfonate groups. Examples of these reactive dyes include, but not limited to, C. I. Reactive Yellow 14, C. I. Reactive Yellow 15, C. I. Reactive Yellow 17, C. I. Reactive Orange 7, C. I. Reactive Orange 16, C. I. Reactive Orange 72, C. I. Reactive Red 23, C. I. Reactive Red 49, C. I. Reactive Red 180, C. I. Reactive Blue 19 (RB 19), C. I. Reactive Blue 20, and C. I. Reactive Blue 21 (RB 21).

It is important that the first compound (hydrophilic vinylic compound) and the second compound (reactive dye) should be well dissolved in the water. These two reactants should form a homogeneous aqueous solution before and after the reaction. Most importantly, the resulting reactive tinting compound should be completely miscible in the lens forming materials before and after cure to prevent the lens defects such as uneven shade of color or inconsistent tinting color from batch to batch.

In synthesis of the present reactive tinting compound, the conditions can be modified according to the type of the reactants. Although many dying assistant chemicals, such as dispersant, salt, wetting agent, fixing agent, etc., are usually applied in the dying process, these dying helpers are not required in the present invention. The actual conditions chosen to react dye with the hydrophilic vinylic reactant should be better determined empirically and varied case by case.

(A) Preparing the Reactive Tinting Compound Using a Dye with Difluoro-chloropyrimidine Group In order to promote the reaction of the difluoro-chloropyrimidine in the dye with the hydroxyl group in the hydrophilic vinylic monomer, it is needed to use a base such as, for example, ammonia, triethyl amine, alkaline metal hydroxide (as sodium hydroxide), and salt of alkaline metal (as sodium bicarbonate) to neutralize the acid by-product. It is also appropriate to choose a base capable of forming easily removable by-product to facilitate the removal of neutralized salt after the reaction. The molar amount of the base is added preferably greater than that of the dye to improve the efficiency and yield of the reaction. Usually, molar ratio of the base to the dye is preferably between 1:1 to 5:1. However, the actual amount of the base used is highly related to the strength of the base.

In the reaction, one molecule of the first compound is bonded to one molecule of the second compound by reacting the hydroxyl group on the first compound with the chloropyrimidine on the second compound. Henceforth, the reactant molar ratio of the first compound to the second compound in the reaction is preferably between 1:1 to 5:1 to facilitate the efficiency and the completion of the reaction. The first compound is mostly added in excess to ensure the minimal amount of the unreacted second compound present after the reaction is completed.

To prevent the unwanted premature reaction of the vinyl groups during the synthesis, the use of a polymerization inhibitor is also necessary. The inhibitor may be hydroquinone, methyl hydroquinone, hydroquinone monomethyl ether, catechol, or pyrogallol. The amount of a polymerization inhibitor used in the reaction is in the range of 0.02 to 3% by weight, based on the weight of the first compound.

In conducting the synthesis, it is important to dissolve the maximal amounts of the first compound and the second compound in water to increase the yield and facilitate the removal of the unwanted by-product after the reaction. The aqueous solution of two reactants is added with desirable amounts of base and inhibitor and sealed in a bottle full with the nitrogen gas. The synthesis is performed at a temperature preferably in the range of 50 to 100° C. for a time preferably in the range of 12 to 24 hours. This process will lead to a considerable yield of the product as determined by using high performance liquid chromatography (HPLC) analyses. Of course, the temperature and the time applied during the synthesis are dependent on the reactants used to prepare the reactive tinting compound.

(B) Preparing the Reactive Tinting Compound Using a Dye with β-sulphatoethylsulphone Group In order to promote the reaction of the β-sulphatoethylsulphone group in the dye with the hydroxyl group in the hydrophilic vinylic monomer, it is needed to use a base such as, for example, ammonia, triethyl amine, and alkaline metal hydroxide (as sodium hydroxide) to activate the β-sulphatoethylsulphone group into reactive vinyl sulfone group first. The molar amount of the base is added preferably greater than that of the second compound to improve the efficiency of the activation step. Usually, the molar ratio of the base to the second compound is preferably between 1:1 to 5:1. However, the actual amount of the base used is highly related to the strength of the base.

In the synthesis, one molecule of the first compound is bonded to one molecule of the second compound by reacting the hydroxyl group on the first compound with the activated vinyl sulfone group on the second compound. Henceforth, the reactant molar ratio of the first compound to the second compound in the reaction is preferably between 1:1 to 5:1 to facilitate the efficiency and the completion of the reaction. The first compound is usually added in excess to ensure the minimal amount of the unreacted second compound present after the reaction is completed.

To prevent the unwanted premature reaction of the vinyl groups during the synthesis, the use of a polymerization inhibitor is optional. The inhibitor can be hydroquinone, methyl hydroquinone, hydroquinone monomethyl ether, catechol, or pyrogallol. The amount of a polymerization inhibitor used in the reaction is in the range of 0.02 to 3% by weight, based on the weight of the first compound.

In conducting the synthesis, the second compound is first activated in the aqueous solution by using a desirable amount of base. The activation step is performed at a temperature preferably in the range of 30 to 80° C. for a time preferably in the range of 0.5 to 4 hours. Then the first compound and inhibitor are added with desirable amounts to the activated second compound solution and sealed in the bottle full with the nitrogen gas. The synthesis is performed at the room temperature to 50° C. for a time preferably in the range of 12 to 24 hours. This process will lead to a considerable yield of the product as determined by HPLC. Of course, the temperature and the time applied during the synthesis are also dependent on the reactants used to prepare the reactive dye-monomer compound.

Upon completion of the synthesis described above for two different types of reactive second compound, the unwanted by-products, unreacted reactants, and water can be easily removed from the produced reactive tinting compound by the conventional methods such as decanting, extracting, centrifuging, and filtering. The as-prepared reactive tinting compound has a purity greater than 85% according to the analyses of HPLC after cyclic separation by aforementioned methods. The synthesized compound with the purity greater than 80% can be used with the lens forming materials to manufacture soft contact lenses without any further purification. The impurity can be rinsed off after the lens is polymerized and demolded. The amount of the invented reactive tinting compound added in the lens is dependent on the lens formulation; the required tone and color, preferably in the range of 0.01 to 0.25%, based on the weight of the lens forming monomers. The reactive tinting compound is completely soluble in the lens forming monomer like the hydroxyethylmethacrylate (HEMA). The substituted vinyl groups in the reactive tinting compound can react with the vinyl groups in the lens forming materials and form covalent bonds through photo initiated free radical polymerization. As a result, the soft contact lenses formed using the reactive tinting compound of the present invention can have the great stability during repeated test in autoclave.

Having been fully described the present invention, examples illustrating its practice are set forth below. These examples should not, however, be considered to limit the scope of the invention, which is defined by the appended claims.

EXAMPLE 1

Synthesis of the Reactive Dye RB 114

A mixture of 20 g HEMA, 4 g sodium hydroxide, 0.1 g hydroquinone, and 500 g distilled water is well mixed in a one liter round bottom flask for 15 minutes. Then 20 g RB 114 is added to the solution and fully dispersed in an ultrasonic bath. The solution is stirred and reacted in an oil bath at 60° C. for 24 hours. After cooled to room temperature, the products are vacuum dried first and then repeatedly purified three times with the methods such as extraction with 95% ethanol, filtration, and vacuum drying. The product after this synthesis yields about 9 g dark powders. The result of HPLC analysis indicates that the purified product has the purity near 98%.

EXAMPLE 2

Synthesis of the Reactive Dye RB 19

A mixture of 25 g RB 19, 2 g sodium hydroxide, and 500 g distilled water is well stirred in a 1 liter round bottom flask for 10 minutes. After well dispersed, the temperature is raised to 40° C. for one hour. Then 8 g HEMA and 0.02 g hydroquinone are added to the above solution and well stirred. The solution is reacted in an oil bath at 30° C. for 24 hours. After cooled to room temperature, the products are vacuum dried first and then repeatedly purified with the methods such as extraction, filtration, and drying as described in Example 1. The product after this synthesis yields about 11 g dark powders. The result of HPLC analysis indicates that the purified product has the purity almost of 87%.

EXAMPLE 3

Synthesis of the Reactive Dye RB 21

A mixture of 25 g RB 21, 2 g sodium hydroxide, and 500 g distilled water is well stirred in a 1 liter round bottom flask for 10 minutes. After well dispersed, the temperature is raised to 40 ° C. for one hour. Then 8 g HEMA and 0.02 g hydroquinone are added to the above solution and well stirred. The solution is reacted in an oil bath at 30° C. for 24 hours. After cooled to room temperature, the products are repeatedly purified with the methods such as extraction, filtration, and drying as described in Example 1. The product after this synthesis yields about 10 g dark powders. The result of HPLC analysis indicates that the purified product has the purity near 90%.

EXAMPLE 4

Synthesis of the Reactive Yellow 15

A mixture of 25 g Reactive Yellow 15, 5 g sodium carbonate, and 500 g distilled water is well stirred in a I liter round bottom flask for 10 minutes. After well dispersed, the temperature is raised to 40° C. for one hour. Then 8 g HEMA and 0.02 g hydroquinone are added to the above solution and well stirred. The solution is reacted in an oil bath at 30° C. for 24 hours. After cooled to room temperature, the products are repeatedly purified with the methods such as extraction, filtration, and drying as described in Example 1. The product after this synthesis yields about 8 g yellow powders. The result of HPLC analysis indicates that the purified product has the purity near 92%.

EXAMPLE 5

Synthesis of the Reactive Red 180

A mixture of 25 g Reactive Red 180, 5 g sodium carbonate, and 500 g distilled water is well stirred in a 1 liter round bottom flask for 10 minutes. After well dispersed, the temperature is raised to 40° C. for one hour. Then 8 g HEMA and 0.02 g hydroquinone are added to the above solution and well stirred. The solution is reacted in an oil bath at 30° C. for 24 hours. After cooled to room temperature, the products are repeatedly purified with the methods such as extraction, filtration, and drying as described in Example 1. The product after this synthesis yields about 7 g powders. The result of HPLC analysis indicates that the purified product has the purity almost of 93%.

EXAMPLE 6

Preparation of the Tinted Soft Contact Lenses

The basic formulation prepared to make the soft contact lenses is listed as followings: 100 parts HEMA, 15 parts N-vinyl pyrrolidone, 0.2 part 2-chlorothioxanthone (photo initiator), 1.5 parts ethylene glycol dimethacrylate (crosslinker), 1.2 part of methacrylic acid, 0.04 part synthesized reactive tinting compound (as prepared in Examples 1–5), and 100 parts glycerin diluent. After well mixed in the ultrasonic bath and filtered, the mixture is placed in the polystyrene mold with a diameter of 12.66 mm, a base curve of 8.625, a central lens thickness of 110 microns, and the power of 100, and cured under a 250 watt UV lamp (wavelength 300–410 nm) for 15 minutes at 60° C. The total accumulated light energy is 1900 mJ/cm$^2$. After curing, the lens is demolded, rinsed with the 80° C. hot water for 20 minutes to remove the inert diluent and unreacted residual constituents, and then hydrated with a standard saline at 25° C. for 24 hours.

The UV-VIS spectra of the lenses are analyzed with a Perkin-Elmer UV-VIS 8453 spectrophotometer before and after autoclave aging. The lens is hold

TABLE 1

Selected Properties of Prepared Tinted Contact Lens

| The Reactive Tinting Compound Added | Water Content (%) | Lens Diameter (mm)# | Tensile Strength (Kg/cm$^2$)* | Elongation (%) | Tinting Stability+ |
|---|---|---|---|---|---|
| Example 1 | 54.4 (0.8)$ | 14.0 | 2.2 | 123 ± 11 | Stable |
| Example 2 | 55.1 (0.9) | 14.1 | 2.1 | 120 ± 12 | Stable |
| Example 3 | 54.6 (0.8) | 14.0 | 2.2 | 118 ± 10 | Stable |
| Example 4 | 54.8 (0.7) | 14.0 | 2.1 | 121 ± 13 | Stable |
| Example 5 | 54.3 (0.9) | 14.1 | 2.1 | 122 ± 12 | −Stable |
| Control (no dye) | 55.2 (0.7) | 14.1 | 2.2 | 126 ± 11 | |

$( ): standard deviation.
99% confidence interval of lens diamter is less than ±0.2 mm
*standard deviation of tensile strength is less than 0.2 Kg/cm$^2$
+Stable: tinting color is not faded or migrated after cyclic autoclave aging.
−Stable: a small noticeable fading after cyclic autoclave aging.

What is claimed is:

1. A method for preparing a reactive tinting compound for tinted contact lens comprising the steps of:
   (a) carrying out a reaction of a first compound having a molecular weight under 300 g/mol with a second compound to generate a product of reactive tinting compound,
   wherein
   the first compound is a hydrophilic compound with pendant hydroxyl and unsaturated vinyl groups, and
   the second compound is a radiation-absorbing and water soluble dye with substituted fluoro-chloropyrimidine or β-sulphatoethylsulphone reactive group; and
   (b) recovering the product after the reaction is completed.

2. The method according to claim 1, wherein the molar ratio of the first compound to the second compound is 1/1 to 5/1.

3. The method according to claim 1, wherein the first compound is selected from the group consisting of 2-hydroxyethyl methacrylate, hydroxylethyl acrylate, and glycerol methacrylate.

4. The method according to claim 1, wherein the second compound with substituted fluoro-chloropyrimidine reactive group is C. I. Reactive Blue 114.

5. The method according to claim 1, wherein the second compound with substituted β-sulphatoethylsulphone reactive group is selected from the group consisting of C. I. Reactive Yellow 15, C. I. Reactive Red 180, C. I. Reactive Blue 19, and C. I. Reactive Blue 21.

6. The method according to claim 1, wherein step (a) comprises the steps of:
   (i) preparing a mixture of the first compound, a base compound, and a polymerization inhibitor in water;
   (ii) mixing the second compound with the mixture of step (i); and
   (iii) initiating a synthesis reaction of the reactive tinting compound under heating.

7. The method according to claim 6, wherein the molar ratio of the first compound to the second compound is 1/1 to 5/1.

8. The method according to claim 6, wherein the first compound is selected from the group consisting of 2-hydroxyethyl methacrylate, hydroxylethyl acrylate, and glycerol methacrylate.

9. The method according to claim 6, wherein the second compound is C. I. Reactive Blue 114 (RB 114).

10. The method according to claim 6, wherein the base compound is selected from the group consisting of ammonia, alkaline metal hydroxide, and salt of alkaline metal.

11. The method according to claim 6, wherein the molar ratio of the base compound to the second compound is 1/1 to 5/1.

12. The method according to claim 6, wherein the polymerization inhibitor is selected from the group consisting of hydroquinone, methyl hydroquinone, hydroquinone monomethyl ether, catechol and pyrogallol.

13. The method according to claim 6, wherein the polymerization inhibitor is 0.02 to 3% based on the weight of the first compound.

14. The method according to claim 6, wherein the reaction is at 50 to 100° C.

15. The method according to claim 6, wherein the reaction is for 12 to 24 hours.

16. The method according to claim 1, whwrein the step (a) comprises the steps of
   i) activating the second compound with a base compound in water;
   ii) mixing the first compound with the resulting mixture of step i);
   iii) optionally mixing a polymerization inhibitor with the mixture of step ii); and
   iv) initiating a synthesis reaction of the reactive tinting compound.

17. The method according to claim 16, wherein the activating step is at 30 to 80° C.

18. The method according to claim 16, wherein the activating step is for 0.5 to 4 hours.

19. The method according to claim 16, wherein the molar ratio of the first compound to the second compound is 1/1 to 5/1.

20. The method according to claim 16, wherein the first compound is selected from the group consisting of 2-hydroxyethyl methacrylate, hydroxylethyl acrylate, and glycerol methacrylate.

21. The method according to claim 16, wherein the second compound is selected from the group consisting of C. I. Reactive Yellow 15, C. I. Reactive Red 180, C. I. Reactive Blue 19, and C. I. Reactive Blue 21.

22. The method according to claim 16, wherein the base compound is selected from the group consisting of ammonia, alkaline metal hydroxide and salt of alkaline metal.

23. The method according to claim 16, wherein the molar ratio of the base compound to the second compound is 1/1 to 5/1.

24. The method according to claim 16, wherein the polymerization inhibitor is selected from the group consisting of hydroquinone, methyl hydroquinone, hydroquinone monomethyl ether, catechol and pyrogallol.

25. The method according to claim 16, wherein the polymerization inhibitor is 0.02 to 3% based on the weight of the first compound.

26. The method according to claim 16, wherein the reaction is at room temperature to 50° C.

27. The method according to claim 16, wherein the reaction is for 12 to 24 hours.

28. A reactive tinting compound which is prepared by the steps comprising:
(1) carrying out a reaction of a first compound having a molecular weight under 300 g/mol with a second compound to generate a product of reactive tinting compound,
   wherein
   the first compound is a hydrophilic compound with pendant hydroxyl and unsaturated vinyl groups, and
   the second compound is a radiation-absorbing and water soluble dye with substituted fluoro-chloropyrimidine or β-sulphatoethylsulphone reactive group; and
(2) recovering the reactive tinting compound after the reaction is completed.

29. A tinted contact lens comprising a hydrophilic monomer material, an inert diluent, an acrylic crosslinker with multiple unsaturated vinyl groups and a reactive tinting compound which is prepared by the steps comprising:
a. carrying out a reaction of a first compound having a molecular weight under 300 g/mol with a second compound to generate a product of reactive tinting compound,
   wherein
   the first compound is a hydrophilic compound with pendant hydroxyl and unsaturated vinyl groups, and
   the second compound is a radiation-absorbing and water soluble dye with substituted fluoro-chloropyrimidine or β-sulphatoethylsulphone reactive group; and
b. recovering the product after the reaction is completed.

30. The lens according to claim 29, wherein the amount of the reactive tinting compound is 0.01 to 0.25% based on the weight of the hydrophilic monomer material.

31. The lens according to claim 29, wherein the hydrophilic monomer material is selected from the group consisted of hydroxy ethyl methacrylate, methacrylic acid, and N-vinyl pyrrolidone.

32. The lens according to claim 29, wherein the acrylic crosslinker with multiple unsaturated vinyl groups is selected from the group consisting of ethylene glycol dimethacrylate and trimethylolpropane trimethacryalte.

* * * * *